(12) United States Patent
Kumfer et al.

(10) Patent No.: US 8,734,648 B2
(45) Date of Patent: May 27, 2014

(54) TREATMENT OF SPENT CAUSTIC WASTE

(75) Inventors: Bryan J. Kumfer, Ringle, WI (US);
Chad L. Felch, Mosinee, WI (US);
Bruce L. Brandenburg, Wausau, WI (US); Richard W. Lehmann, Birnamwood, WI (US)

(73) Assignee: Siemens Energy, Inc., Orlando, FL (US)

( * ) Notice: Subject to any disclaimer, the term of this patent is extended or adjusted under 35 U.S.C. 154(b) by 531 days.

(21) Appl. No.: 12/677,642

(22) PCT Filed: Sep. 11, 2008

(86) PCT No.: PCT/US2008/010625
§ 371 (c)(1),
(2), (4) Date: Jun. 14, 2010

(87) PCT Pub. No.: WO2009/035642
PCT Pub. Date: Mar. 19, 2009

(65) Prior Publication Data
US 2010/0252500 A1 Oct. 7, 2010

Related U.S. Application Data

(60) Provisional application No. 60/971,386, filed on Sep. 11, 2007, provisional application No. 60/971,400, filed on Sep. 11, 2007, provisional application No. 60/971,410, filed on Sep. 11, 2007.

(51) Int. Cl.
*C02F 1/72* (2006.01)
*C02F 11/08* (2006.01)

(52) U.S. Cl.
USPC .................. 210/631; 210/743; 210/761

(58) Field of Classification Search
USPC .................. 210/743, 758, 761, 631, 762
See application file for complete search history.

(56) References Cited

U.S. PATENT DOCUMENTS

| | | | | |
|---|---|---|---|---|
| 4,347,226 A * | 8/1982 | Audeh et al. | | 210/761 |
| 4,350,599 A * | 9/1982 | Chowdhury | | 210/761 |
| 5,230,810 A * | 7/1993 | Clark et al. | | 210/761 |
| 5,244,576 A | 9/1993 | DeRoeck | | |
| 5,246,597 A * | 9/1993 | Jenson et al. | | 210/759 |
| 6,576,144 B1 | 6/2003 | Vineyard | | |
| 7,005,076 B2 | 2/2006 | Chowdhury | | |
| 2004/0245188 A1* | 12/2004 | Chowdhury et al. | | 210/758 |

* cited by examiner

*Primary Examiner* — Lucas Stelling

(57) ABSTRACT

Systems and methods are provided for the treatment of caustic wastewater. Specifically, systems and methods are provided for combining refinery spent caustic and ethylene spent caustic solutions and treating the combined spent caustic mixture using a wet air oxidation process.

19 Claims, 3 Drawing Sheets

US 8,734,648 B2

TREATMENT OF SPENT CAUSTIC WASTE

RELATED APPLICATIONS

This application claims priority under 35 U.S.C. §119(e) to U.S. Provisional Application Ser. No. 60/971,386, titled REDUCTION OF pH OF SPENT CAUSTIC PRIOR TO WAO FOR INCREASED PERFORMANCE; U.S. Provisional Application Ser. No. 60/971,400, titled COMBINING SPENT CAUSTIC FROM ETHYLENE PRODUCTION AND PETROLEUM REFINING FOR WET AIR OXIDATION; and U.S. Provisional Application Ser. No. 60/971,410, titled pH ADJUSTMENT TECHNIQUES, each of which were filed on Sep. 11, 2007, and each of which is herein incorporated by reference in its entirety for all purposes.

BACKGROUND OF INVENTION

1. Field of Invention

The present disclosure is directed toward methods and systems for the treatment of caustic wastewater and, more specifically, to the treatment of caustic wastewater by wet air oxidation.

2. Discussion of Related Art

Wet air oxidation is a well-known technology for treating process streams, and is widely used, for example, to destroy pollutants in wastewater. The method involves aqueous phase oxidation of undesirable constituents by an oxidizing agent, generally molecular oxygen from an oxygen-containing gas, at elevated temperatures and pressures. The process can convert organic contaminants to carbon dioxide, water, and biodegradable short chain organic acids, such as acetic acid. Inorganic constituents including sulfides, mercaptides, and cyanides can also be oxidized. Wet air oxidation may be used in a wide variety of applications to treat process streams for subsequent discharge, in-process recycle, or as a pretreatment step to supply a conventional biological treatment plant for polishing.

Wet air oxidation units are in many cases operated at specific temperature and pressure ranges and sometimes with the addition of specific catalysts, depending on the nature and composition of the process stream to be treated. Operating conditions suitable for the treatment of some process streams may not be suitable for the treatment of different process streams.

SUMMARY OF INVENTION

In accordance with an embodiment of the present disclosure there is provided a method for treating a waste stream. The method comprises providing an ethylene production spent caustic comprising at least a first organic compound, providing a refinery spent caustic comprising at least a second organic compound, combining at least a portion of the ethylene production spent caustic with at least a portion of the refinery spent caustic in a ratio sufficient to produce a combined stream comprising a chemical oxygen demand (COD) level below that which results in the precipitation of carbonate during wet air oxidation of the combined stream, and oxidizing the combined stream at an elevated temperature and a super-atmospheric pressure sufficient to treat at least a portion of the second organic compound.

In some aspects of the method, the second organic compound is a naphthenic compound and in some aspects, the second organic compound is a cresylic compound.

Some aspects of the method may further comprise monitoring a pH of the oxidized combined stream with a pH sensor and adding a pH adjuster to the combined stream responsive to a signal from the pH sensor. In accordance with some aspects, the pH adjuster may be carbon dioxide, and in others, the pH adjuster may be a base.

In some aspects, the step of oxidizing the combined stream may comprise oxidizing the combined stream in a wet air oxidation unit comprising a head space and introducing carbon dioxide into the head space of the wet air oxidation unit.

Some aspects of the method further comprise biologically treating at least a portion of the oxidized combined stream. Some aspects further comprise adjusting the pH of a portion of the oxidized combined stream prior to the biological treatment.

According to some aspects of the method, the step of combining at least a portion of the ethylene production spent caustic with at least a portion of the refinery spent caustic comprises combining at least a portion of the ethylene production spent caustic with at least a portion of the refinery spent caustic in piping of a system used to treat the combined stream. According to other aspects, the step of combining at least a portion of the ethylene production spent caustic with at least a portion of the refinery spent caustic comprises combining at least a portion of the ethylene production spent caustic with at least a portion of the refinery spent caustic in a mixing vessel.

Some aspects of the method further comprise adding at least one of amine wastewater, sour wastewater, wash water, decant slop, and biological sludge to the combined spent caustic stream.

According to some aspects of the method, oxidizing the combined stream comprises oxidizing the combined stream at a temperature in a range of between about 200 degrees Celsius and about 280 degrees Celsius.

In some aspects of the method, the COD level of the combined stream is less than about 125,000 mg/L.

In accordance with a further embodiment of the present disclosure, there is provided a system for treating a waste stream. The system comprises a wet air oxidation unit comprising an inlet and an outlet, a source of ethylene production spent caustic in fluid communication with the inlet of the wet air oxidation unit, and a source of refinery spent caustic in fluid communication with the inlet of the wet air oxidation unit.

According to some aspects, the system further comprises a pH sensor configured to detect a pH of an effluent of the wet air oxidation unit, a controller coupled to the pH sensor, and a source of pH adjuster coupled to the controller and in fluid communication with the wet air oxidation unit.

Some aspects of the system further comprise a source of carbon dioxide in fluid communication with the wet air oxidation unit. According to further aspects, the system further comprises a source of a base in fluid communication with the wet air oxidation unit.

In accordance with some aspects, the wet air oxidation unit comprises a wet air oxidation unit formed from stainless steel, and according to some aspects, the wet air oxidation unit comprises a wet air oxidation unit formed from titanium.

Some aspects of the system further comprise a biological waste stream treatment unit in fluid communication with and downstream of the wet air oxidation unit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
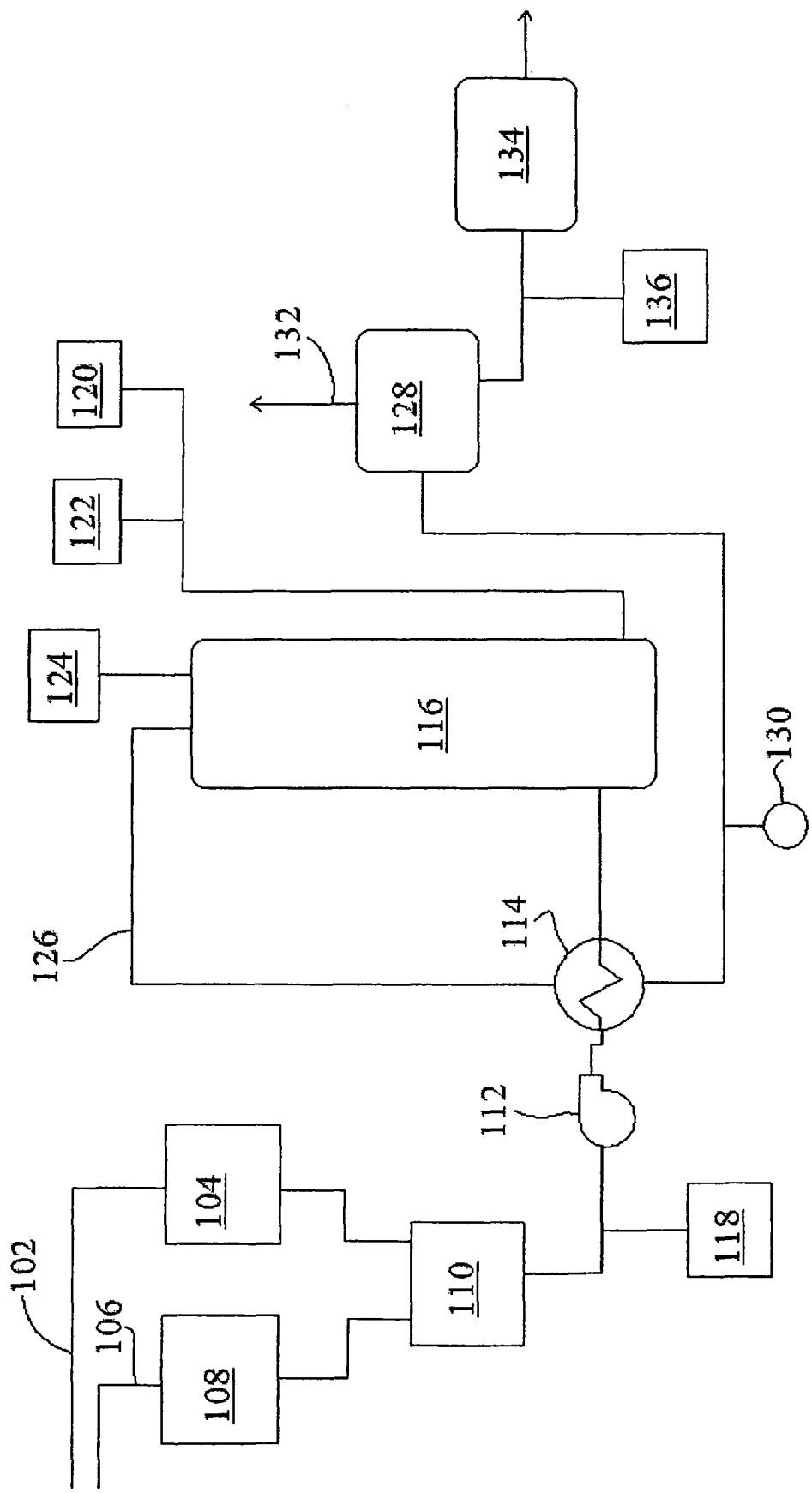
FIG. 1 is a schematic of a spent caustic waste treatment system according to an embodiment of the present disclosure.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In industries such as petroleum refining and ethylene production, aqueous caustic washing is sometimes employed to improve the quality of the product and/or aid in the refining process. The caustic washings are done to remove, for example, sulfidic and/or acidic components from the relevant hydrocarbon streams. Aqueous spent caustic solutions from these treatments may contain various contaminants such as sulfides, mercaptans, naphthenates, cresylates, and emulsified hydrocarbons. The aqueous spent caustics may often have high pH levels, for example, pH levels of about 13 or above. Environmental and safety considerations may make treatment of the spent caustic desirable before it is discharged to the environment.

Wet air oxidation (WAO) may be used to treat some types of spent caustic waste streams. WAO may treat the spent caustic by oxidizing the sulfides and mercaptans to sulfate and breaking down the naphthenic and cresylic compounds. The treated spent caustic may be further treated in a biologic treatment system. Depending on the type of spent caustic and the concentrations of the various contaminants contained therein, design and operating parameters such as temperature, pressure, hydraulic retention time, pH adjustment methodologies, and post treatment methodologies may be tailored for the treatment of a particular waste stream.

This disclosure will describe a number of waste streams that may be treated alone or in combination in a WAO system. This disclosure will also describe systems and methods for treating a combination of different caustic waste steams by WAO. Specifically, this disclosure will describe systems and methods that have been discovered that facilitate the dilution of refinery spent caustic with ethylene spent caustic to form a combined caustic stream, and treatment of the combined stream in a common WAO vessel. For example, one aspect of a method described in this disclosure comprises combining an ethylene production spent caustic comprising at least a first organic compound, and a refinery spent caustic comprising at least a second organic compound in a ratio sufficient to produce a combined stream comprising a COD level below that which results in the precipitation of salts such as sodium carbonate during wet air oxidation of the combined stream. For example, the combined stream may have a COD level less than 125,000 mg/L, and in some aspects of the invention the combined stream may have a COD of about 1000,000 mg/L. The combined stream may be oxidized at an elevated temperature and a super-atmospheric pressure sufficient to treat at least a portion of the second organic compound.

In one embodiment, the heat released during oxidation of a combined stream comprising a COD of about 100,000 mg/L may be sufficient to sustain the reaction but not generate a significant amount of excess heat which would be removed from the wet oxidation unit. It has been found that a COD of greater than about 125,000 mg/L of the combined stream may result in difficulty controlling the heat in the system. It has also been found that a COD of greater than about 125,000 mg/L of the combined stream may result carbonate precipitation at particular temperatures, pH and the efficiency of the organic oxidation.

As used in this disclosure, the term "refinery spent caustic" refers to spent caustic generated in the operation of equipment and processes such as those which may be found at a petroleum refinery. The term "ethylene spent caustic" refers to spent caustic generated in the operation of equipment and processes such as those which may be found at an ethylene production facility, such as caustic used in the scrubbing of ethylene. Refinery spent caustic may have high levels of chemical oxygen demand (COD), in some cases between about 400,000 mg/L and 500,000 mg/L or more, while ethylene spent caustic may have a much lower level of COD, in some cases 30,000 mg/L or less. Refinery spent caustic may contain one or more of naphthenic spent caustics, cresylic spent caustics, and sulfidic spent caustics. Ethylene spent caustics may contain sulfides carbonates and a small fraction of organic compounds.

Naphthenic spent caustics may be produced from the scrubbing of kerosene and jet fuels and may contain high concentrations of organic compounds consisting of naphthenic acids, and also may contain phenol compounds and reduced sulfur compounds. Naphthenic spent caustics may also contain high levels of chemical oxygen demand (COD), in some cases greater than 100,000 mg/L. Naphthenic spent caustics may also contain thiosulfates and naphthenic acids, which may be broken down in a wet air oxidation process at temperatures above about 220° C. to about 280° C. or higher. The characterization of the contaminants and properties of a number of different samples of naphthenic spent caustics is illustrated below in Table 1:

TABLE 1

Characterization of Naphthenic Spent Caustics

| | | | Sample Type | | | | | |
|---|---|---|---|---|---|---|---|---|
| | | | Naphthenic | Naphthenic | Naphthenic | Naphthenic | Naphthenic | Naphthenic |
| | | | | | Sample Description | | | |
| | | | GTU Caustics | Karu Merox S.C. Ex. Settler | Karu Merox Electrostatic Coalescer | S.C. Combined | LLCN Caustics Washer | S.C.MCN |
| | | | | | Sample Location | | | |
| Analytical Results | Units | Reported As | V809 | V1613 | V1602 | TR269 | V 705 | V60 |
| Chemical Oxygen Demand | mg/L | $O_2$ | 72,200 | 38,400 | 16,500 | 49,600 | 158,000 | 126,000 |
| Dissolved Inorganic Carbon | mg/L | C | 442 | 2,170 | 60 | 391 | 2750 | 380 |

TABLE 1-continued

Characterization of Naphthenic Spent Caustics

| | | | Sample Type | | | | | |
|---|---|---|---|---|---|---|---|---|
| | | | Naphthenic | Naphthenic | Naphthenic | Naphthenic | Naphthenic | Naphthenic |
| | | | | | Sample Description | | | |
| | | | GTU Caustics | Karu Merox S.C. Ex. Settler | Karu Merox Electrostatic Coalescer | S.C. Combined | LLCN Caustics Washer | S.C.MCN |
| | | | | | Sample Location | | | |
| Analytical Results | Units | Reported As | V809 | V1613 | V1602 | TR269 | V 705 | V60 |
| Non Purgable Organic Carbon | mg/L | C | 23,600 | 13,900 | 4,240 | 6,250 | 28,500 | 43,500 |
| Biological Oxygen Demand | mg/L | $O_2$ | 53,600 | 11,700 | 6,980 | 17,500 | 65,600 | 106,000 |
| BOD:COD ratio | — | — | 0.74 | 0.30 | 0.42 | 0.35 | 0.42 | 0.84 |
| Total Sulfur | mg/L | S | 1,050 | 236 | 171 | 12,100 | 40,600 | 2,020 |
| Potertiometric Sulfide | mg/L | S | 342 | <30 | <30 | 11,100 | 45,700 | <30 |
| Potertiometric Mercaptan | mg/L | $CH_3SH$ | <30 | <30 | <30 | 432 | 1,450 | <30 |
| Sulfate | mg/L | S | 83.4 | 29.6 | 19.2 | 30.7 | 31.8 | 131 |
| Sulfite | mg/L | S | 331 | 6 | 86 | 29 | 29 | 368 |
| Thiosulfate | mg/L | $S_2O_3$ | 3,090 | 325 | 271 | 650 | 2,170 | 5,690 |
| Phenolics | mg/L | $C_6H_6O$ | 20,700 | 732 | 1,570 | 2,610 | 22,800 | 37,800 |
| Phenol | mg/L | $C_6H_6O$ | <460 | <9.2 | <9.2 | <46 | 10,100 | <460 |
| Naphthenic Acids (Diesel Range Organics) | mg/L | — | 27,800 | 6,730 | 8,240 | 8,760 | 8,220 | 67,800 |
| p Alkalinity | mg/L | $CaCO_3$ | 255,000 | 47,000 | 26,900 | 62,500 | 208,000 | 296,000 |
| m Alkalinity | mg/L | $CaCO_3$ | 262,000 | 60,800 | 28,300 | 84,800 | 299,000 | 305,000 |
| Specific Gravity | — | — | 1.192 | 1.070 | 1.024 | 1.072 | 1.218 | 1.224 |
| Total Sodium | mg/L | Na | 117,000 | 36,900 | 13,900 | 41,300 | 151,000 | 138,000 |
| pH | — | — | 13.1 | 13.3 | 13.4 | 13.2 | 13.0 | 12.8 |

Sulfidic refinery spent caustics may be produced from the scrubbing of hydrocarbons such as liquefied petroleum gas products and may contain high concentrations of reduced sulfur compounds, such as sulfides and mercaptans, and may have low organic carbon concentrations. The characterization of the contaminants and properties of a number of different samples of sulfidic spent caustics is illustrated below in Table 2:

TABLE 2

Characterization of Sulfidic Refinery Spent Caustics

| | | | Sample Type | | | | | |
|---|---|---|---|---|---|---|---|---|
| | | | Sulfidic | Sulfidic | Sulfidic | Sulfidic | Sulfidic | Sulfidic |
| | | | | | Sample Description | | | |
| | | | VBU Caustics | GRU Caustics | 2 Poly H2S Abs | 2 Poly & 1 LPG | LPG Caustic Washer | 2 Poly & 1 LPG |
| | | | | | Sample Location | | | |
| Analytical Results | Units | Reported As | V503F | V503E | VH16 | V54 | V-57 | C401 |
| Chemical Oxgen Demand | mg/L | $O_2$ | 96,600 | 67,700 | 46,900 | 8,120 | 84,800 | 5,980 |
| Dissolved Inorganic Carbon | mg/L | C | 87 | 1,700 | 107 | 292 | 186 | 290 |
| Non Purgable Organic Carbon | mg/L | C | 2,840 | 1,540 | 635 | 1,440 | 2,150 | 1,410 |
| Biological Oxygen Demand | mg/L | $O_2$ | <20000 | 10,000 | <6000 | 2,530 | 6,510 | 1,250 |
| BOD:COD ratio | — | — | <0.21 | 0.15 | <0.13 | 0.31 | 0.08 | 0.21 |
| Total Sulfur | mg/L | S | 24,400 | 8,540 | 23,000 | 950 | 10,600 | 1,000 |
| Potertiometric Sulfide | mg/L | S | 29,300 | 8,920 | 22,900 | 981 | 10,600 | 752 |
| Potertiometric Mercaptan | mg/L | $CH_3SH$ | 17,800 | 20,100 | 2,790 | 2,340 | 61,200 | 955 |
| Sulfate | mg/L | S | 4.56 | 41.2 | 28.5 | 87.3 | 56.5 | 53.2 |
| Sulfite | mg/L | S | 13 | 12 | 280 | 63 | 69 | 23 |
| Thiosulfate | mg/L | $S_2O_3$ | 16,300 | 434 | 13,100 | 3,250 | 3,680 | 867 |
| Phenolics | mg/L | $C_6H_6O$ | 1,400 | 263 | 10 | 0.76 | 0.59 | <0.500 |
| Phenol | mg/L | $C_6H_6O$ | <460 | 120 | <0.46 | <0.46 | <0.46 | <0.46 |
| Naphthenic Acids (Diesel Range Organics) | mg/L | — | 2,140 | 737 | <250 | <250 | <250 | <250 |
| p Alkalinity | mg/L | $CaCO_3$ | 55,000 | 240,000 | 191,000 | 261,000 | 187,000 | 265,000 |
| m Alkalinity | mg/L | $CaCO_3$ | 93,500 | 265,000 | 227,000 | 267,000 | 205,000 | 271,000 |
| Specific Gravity | — | — | 1.080 | 1.182 | 1.164 | 1.182 | 1.144 | 1.188 |

TABLE 2-continued

Characterization of Sulfidic Refinery Spent Caustics

| | | | Sample Type | | | | | |
|---|---|---|---|---|---|---|---|---|
| | | | Sulfidic | Sulfidic | Sulfidic | Sulfidic | Sulfidic | Sulfidic |
| | | | | | Sample Description | | | |
| | | | VBU Caustics | GRU Caustics | 2 Poly H2S Abs | 2 Poly & 1 LPG | LPG Caustic Washer | 2 Poly & 1 LPG |
| | | | | | Sample Location | | | |
| Analytical Results | Units | Reported As | V503F | V503E | VH16 | V54 | V-57 | C401 |
| Total Sodium | mg/L | Na | 48,400 | 114,000 | 107,000 | 111,000 | 95,600 | 122,000 |
| pH | — | — | 13.1 | 13.2 | 13.2 | 13.2 | 13.3 | 13.2 |

Cresylic spent caustics may be produced from the scrubbing of gasoline and may contain high concentrations of phenol compounds (cresylic acids) and can also contain reduced sulfur compounds.

Ethylene spent caustic may be similar to sulfidic spent caustic, but may have relatively lower levels of sulfur compounds and a lower COD. Ethylene spent caustic may come from the caustic scrubbing of cracked gas from an ethylene cracker. This liquor may be produced by a caustic scrubbing tower. Ethylene product gas may be contaminated with $H_2S$ (g) and $CO_2$ (g), and those contaminants may be removed by absorption in the caustic scrubbing tower to produce NaHS (aq) and $Na_2CO_3$ (aq). The sodium hydroxide may be consumed and the resulting wastewater (ethylene spent caustic) contaminated with the sulfides and carbonates and a small fraction of organic compounds. Insoluble polymers resulting from the condensation of olefins during scrubbing may also be present. Some components which may be found in ethylene spent caustic are shown below in Table 3:

TABLE 3

Components of a Representative Ethylene Spent Caustic

| Compound | Representative Range of Amount Present |
|---|---|
| NaHS | 05.%-6% |
| $Na_2CO_3$ | 1%-5% |
| NaOH | 1%-4% |
| NaSR | 0%-0.2% |
| Soluble Oil | 50 ppm-200 ppm |
| Benzene | 20 ppm-100 ppm |

WAO is an aqueous phase oxidation process using molecular oxygen contained in air (or any other oxygen containing gas) as an oxidant. The process may operate at elevated temperatures and super-atmospheric pressures. Some WAO systems may operate at temperatures and pressures which may range from about 120° C. (248° F.) to 320° C. (608° F.) and 760 kPa (110 psig) to 21,000 kPa (3000 psig), respectively. Some systems may operate at temperatures as high as the critical temperature of water, 374° C. Other systems may operate at even higher temperatures wherein the fluid being treated in the vessel may exist at least in part as a supercritical fluid. The utilization of higher treatment temperatures may reduce the amount of time required for a desired level of treatment.

In some systems the pressure of the reaction vessel may be controlled to a specific set point, and in others the pressure of the reaction vessel may attain a certain level as a result of the heating of the fluid being treated and the atmosphere within the sealed vessel.

In some WAO systems the wastewater or feed liquor to be treated is pumped up to pressure by a high pressure feed pump. A gas stream, such as air, containing sufficient oxygen to meet the oxygen demand requirements of the waste stream may then be injected into the pressurized waste stream, and the air/liquid mixture may be preheated to the desired reactor inlet temperature. The mixture may then be introduced into a reactor vessel where the majority of oxidation may take place. Alternatively, or in addition, oxygen containing gas may also be injected directly into the WAO reaction vessel. Some WAO systems also include subsystems allowing the pH of the waste stream to be treated to be adjusted. A pH adjuster, such as an acid or a base, may be added to the stream to be treated before introduction into the WAO reactor vessel, or into the reactor vessel itself.

The WAO reactor may provide sufficient retention time to allow the oxidation to approach a desired reduction in COD. Oxidation reactions, being exothermic, typically produce a temperature rise in the reactor, making the reactor outlet temperature higher than the inlet temperature. This temperature differential may allow for the recovery of heat from the hot reactor effluent. The hot reactor effluent may be used, for example, to preheat the feed to the reactor.

In some cases, there is more thermal energy available than is required for preheating the reactor feed. Even after heating the reactor feed, therefore, the reactor effluent may still require cooling before discharge.

After cooling, the pressure of the reactor effluent stream may be reduced and separated into vapor and liquid phases. The liquid phase may be transferred or discharged to a further treatment system, such as a biological treatment plant for final polishing. The vapor phase may be further treatment or released to the environment.

Naphthenic spent caustics often have a high COD, and as a result, are not readily biodegradable. These spent caustics may have an odor due to the organic and reduced sulfur compounds contained therein and may have a tendency to foam. Some WAO units for treating naphthenic spent caustics may operate at temperatures and pressures sufficient to treat at least one organic compound present in the naphthenic spent caustic. For example, the naphthenic spent caustic may be treated in a wet air oxidation unit at a temperature ranging between about 220° C. and about 370° C. at a sufficient pressure to maintain at least a portion of the caustic as a liquid. The naphthenic spent caustic may be treated in a wet air oxidation unit at a temperature ranging between about 240° C. and about 320° C. at a pressure and a hydraulic retention time sufficient to achieve a desired COD destruction. Other systems may operate in a temperature range of between about 240° C. and about 260° C. with a hydraulic retention time of about 60 minutes. Due to the corrosive nature of naphthenic acids, a high nickel alloy may be used for the materials of construction of a WAO system for the treatment of naphthenic spent caustic. During wet air oxidation, the naphthenic acids may be oxidized to carbon dioxide (which forms carbonate in an alkaline solution) and short chain organic acids such as acetic and oxalic acid. Phenolic compounds, which may be present in some naphthenic spent caustic, can be treated in a temperature range of between about 220° C. and about 260° C. and thus are treatable within the temperature range at which the naphthenic compounds may be treated. As with the naphthenic compounds, the phenolic compounds are converted to carbon dioxide and short chain organic acids. During WAO, reduced sulfur compounds are converted to oxidized sulfate compounds.

The reactions associated with the oxidation of sulfide species in wet air oxidation are as follows:
1. $2NaHS+2O_2 \rightarrow Na_2S_2O_3+H_2O$
2. $NaHS+3/2O_2 \rightarrow NaHSO_3$
3. $NaHS+2O_2 \rightarrow NaHSO_4$
4. $NaSR+O_2 \rightarrow NaHSO_4+RCOOH$(Unbalanced)

Naphthenic and Cresylic compounds may be oxidized by the following reactions:
5. $[Naphthenics]+O_2 \rightarrow CO_2+RCOONa$(Unbalanced)
6. $[Cresylics]+O_2 \rightarrow CO_2+RCOONa$(Unbalanced)
where R may be, for example, $CH_3$.

In general, reactions 1 and 2 can be achieved at low temperatures, for example, below about 200° C., and may be the primary reactions which occur in WAO systems operating at temperatures between about 100° C. to about 200° C. Reactions 3 and 4 are generally limited to systems operating at temperatures between about 200° C. and about 260° C. or systems operating at temperatures between about 260° C. and about 374° C. where all reduced sulfur is converted to sulfate.

With lower temperature systems operating at 150° C. (302° F.) or less, the effluent will contain thiosulfate, sulfite, and sulfate as the oxidation products. Increasing temperature, retention time, and oxygen partial pressure will tend to increase the percentage of reduced sulfur converted to sulfate and correspondingly reduce the amount of thiosulfate and sulfite produced.

The extent of oxidation of the organic fraction of the spent caustic will typically be very small in lower temperature systems. At higher temperatures, for example 190° C. (374° F.) and above, an organic COD reduction of approximately 50 percent or greater can be achieved.

Sulfidic spent caustics often have a high COD and, accordingly, are not readily biodegradable. These spent caustics may also have a strong odor due to the reduced sulfur compounds present in the spent caustic. Some WAO units for treating sulfidic spent caustics may operate at temperatures ranges of between about 180° C. and about 260° C. with a hydraulic retention time sufficient to achieve a desired COD destruction. Some WAO units for treating sulfidic spent caustics may operate at a temperature of about 200° C. with a hydraulic retention time of about 60 minutes. At least a portion of the COD may be attributed to reduced sulfur compounds, such as sulfides and mercaptans. During WAO, the reduced sulfur compounds are converted to sulfate and sulfonic acids. In some cases it is desirable to treat sulfidic spent caustic streams at temperatures of 200° C. or greater. This is due to the incomplete oxidation of sulfide which forms thiosulfate at temperatures less than 200° C. The formation of thiosulfate can add a significant COD load to a biological treatment unit that may be utilized in a post-treatment operation following WAO. By treating the sulfidic spent caustic at 200° C. or greater, the thiosulfate is reduced to near non-detectable ranges and $H_2S$ is readily oxidizes to sulfate ($SO_4$), typically with a COD destruction of greater than 99%.

WAO treatment of ethylene spent caustic may be performed at lower temperatures (less than about 175° C.), which may not be sufficient for treating refinery spent caustics, as noted above. Although it has been discovered that the treatment of ethylene spent caustic at higher temperatures may be feasible, this has not typically been done due to the increased power and associated operating cost associated with maintaining an ethylene spent caustic WAO treatment vessel at elevated temperatures. In addition, elevated treatment temperatures may result in higher pressures within a WAO reaction vessel. Thus, if ethylene spent caustic were to be treated at a higher temperature, a more pressure resistant vessel might be required than might be required if operating at lower temperatures. Such a vessel may cost more than a vessel in which ethylene spent caustic is conventionally treated.

In some cases, it is desirable to maintain a COD level in a spent caustic solution to be treated in a WAO system below that which may result in the precipitation of salts such as sodium carbonate during wet air oxidation of the combined stream. It may also be desirable to maintain the COD level below that which may generate excess heat beyond that which the wet air oxidation unit may handle. In some aspects, it may be desirable to maintain a COD level in a spent caustic solution to be treated in a WAO system above a level which will allow the oxidation reactions to produce enough heat to be self-sustaining, but low enough to reduce the potential for the precipitation of solids, such as a COD level of less than about 125,000 mg/L. In one embodiment the COD level used may range between about 20,000 mg/L and about 100,000 mg/L.

Dilution of a high COD spent caustic, such as a refinery spent caustic, may be performed to achieve a desired COD level in a spent caustic stream to be treated by WAO. For example, for the treatment of refinery spent caustic, which may have a COD level of between about 400,000 mg/L and 500,000 mg/L or above, dilution of the caustic influent may be desirable. Dilution of refinery spent caustic is typically performed with water to reduce the COD level of the caustic waste to be treated to below that which may result in the precipitation of salts such as sodium carbonate during wet air oxidation of the combined stream, and such that a degree of heat beyond that which the system may handle is not generated, for example, below about 125,000 mg/L. However, there are drawbacks to this process. The dilution of refinery spent caustic with water increases the total volume of caustic solution to be treated, thus, in some cases requiring larger and/or a greater number of WAO units to be provided, which may increase the capital costs associated with the WAO system. A greater amount of oxidized spent caustic may require post treatment, which may increase operating costs. Also, there are costs associated with providing dilution water and reclamation of this water.

Treatment of a combined stream of refinery spent caustic and ethylene spent caustic utilizing WAO has provided unexpected results. In some embodiments of the invention of the present disclosure, refinery spent caustic, ethylene spent caustic, and in some aspects, other waste fluids, may be combined in a ratio to produce a mixture with a COD below that which may result in the precipitation of salts such as sodium carbonate during wet air oxidation of the combined stream, and such that a degree of heat beyond that which the system may handle is not generated, for example, a COD level of less than about 125,000 mg/L. In some aspects, a target COD of the mixture may be set at between about 20,000 mg/L and about 100,000 mg/L. The combined stream may be oxidized at an elevated temperature and a super-atmospheric pressure sufficient to treat at least a portion of the COD of the combined stream, including at least a portion of an organic compound provided in the refinery spent caustic, such as a naphthenic or cresylic compound.

Systems for performing this method may comprise a wet air oxidation unit comprising an inlet and an outlet, a source of ethylene production spent caustic in fluid communication with the inlet of the wet air oxidation unit, and a source of refinery spent caustic in fluid communication with the inlet of the wet air oxidation unit.

The oxidation reactions of the combined refinery spent caustic and the ethylene spent caustic surprisingly do not interfere with one another, and the presence of both may even assist the treatment of the two spent caustics. Conventional practice is to treat these waste streams separately due to the differences in treatment conditions required to break down the different contaminants of interest in the different waste streams and the differences in the way that the oxidized spent caustic from each process are post-treated. It was unexpected that the reactions resulting in the oxidation of the components of the different waste streams could proceed and produce an acceptable level of COD reduction without interfering with one other.

In many cases, refinery spent caustic has a COD level that is too high to be treated "as is" in the WAO system. In these cases, dilution water is typically added and the size and/or run rate of the WAO system may be adjusted to account for the dilution water. Ethylene spent caustic typically has a lower COD level than refinery spent caustic, and thus may be at least partially or completely substituted for the dilution water. The dilution water used to dilute the refinery spent caustic may thus be at least partially or completely replaced with a waste stream that one may also desire to treat. It may be more efficient to dilute with the ethylene spent caustic and treat both the ethylene spent caustic and the refinery spent caustic at the same time rather than use water to dilute the refinery spent caustic and treat it separately from the ethylene spent caustic. Capital costs may be reduced because one common WAO vessel may be used instead of having separate vessels and attendant pumps, piping, and the like for treating the two different waste streams independently. Operating costs may be reduced by reducing or eliminating the need for providing and reclaiming dilution water, and by reducing the total amount of oxidized caustic that may be subject to post treatment.

The presence of ethylene spent caustic in the mixed caustic stream to be treated may also reduce energy consumption, facilitating reduction of operating costs with regard to the provision of power. The reaction of converting sulfides that may be present in the ethylene spent caustic to sulfate is exothermic. This additional heat can be utilized and reduce any heat input required to heat the refinery spent caustic to an appropriate temperature for treatment by WAO, for example an temperature of between about 240° C. and about 320° C., that in some embodiments may facilitate treatment.

Further, dilution of refinery spent caustic with ethylene spent caustic may allow for superior pH control of the oxidized caustic. Diluting the refinery spent caustic with ethylene spent caustic instead of water may help prevent the pH of the oxidized spent caustic mixture from dropping to a point at which the oxidized solution might damage the WAO reaction vessel. This is because the ethylene spent caustic may counteract the effect on pH of acids produced during the oxidation of the refinery spent caustic. Naphthenic acids produced by the oxidation of refinery spent caustic may cause the pH of refinery spent caustic diluted with water to drop more significantly than when the ethylene caustic is present in the combined caustic. The presence of ethylene caustic may buffer the acid production in the naphthenic spent caustic.

The effluent from a WAO unit may be treated such as by pH adjustment to facilitate further downstream treatment. For example, the WAO effluent may be transferred to a biological treatment unit as a post-treatment step. For this, the effluent may be pH adjusted, for example, to a pH level of between about 6.5 and 8, although an even narrower range of pH may be desired. With oxidized ethylene spent caustics there is little buffering capacity, so the oxidized caustic may be adjusted from a high pH to a low pH with only a small amount of acid, resulting in gross adjustment control. pH control of oxidized ethylene spent caustic may therefore be difficult because the amount of acid added to the oxidized ethylene spent caustic may need to be tightly controlled. With the addition of refinery spent caustic to the ethylene spent caustic, during oxidation, the $CO_2$ produced by the oxidation of the refinery spent caustic combines with the caustics and forms carbonate. The carbonate has a significant buffering capacity. The pH of the effluent of a combined mixture of refinery spent caustic and ethylene spent caustic treated by WAO may change more slowly with the addition of acid, making it easier to adjust the effluent pH into a desired range.

Refinery spent caustic may be produced continuously or in batches. Thus, systems for treating refinery spent caustic and ethylene spent caustic together in a single WAO vessel may include buffer or storage tanks for storing either ethylene or refinery spent caustic until a desired amount of each is available. These systems may also include mixing tanks or other forms of mixing systems where the caustic streams are mixed in bulk in sufficient amounts to achieve a desired COD in the combined stream. The different caustic streams may also be combined in-line at appropriate ratios during the operation of a WAO treatment system.

Systems according to some embodiments of the present disclosure are not limited to treating only combinations of refinery spent caustic and ethylene spent caustic. Other waste streams may also be combined with the spent caustic streams for treatment in a WAO system. Examples of these additional waste streams include amine wastewater, sour wastewater (as used herein, the term "sour" refers to liquid streams and water streams that contain a high content of sulfur, hydrogen sulfide, and/or ammonia), wash water, decant slop, and biological sludge.

In some WAO systems, the reaction vessels may be constructed comprising materials such as nickel, that are resistant to cracking brought about by exposure to highly caustic solutions, but which are subject to corrosion at low pH levels. In such systems it may be desirable to add additional caustic, such as NaOH, to the spent caustic waste to be treated in the WAO vessel to counteract any effect of the reduction in pH due to the production of acidic reaction products.

Other WAO systems may include reaction vessels comprising materials such as stainless steel or titanium, which are more resistant to corrosion under acidic conditions than nickel, but which are more susceptible to attack by caustic solutions. In these systems, caustic waste streams to be treated may be pH adjusted, for example to below 12 by the addition of an acid such as sulfuric acid or carbon dioxide.

The wet air oxidation unit may comprise one or more control systems, such as pH, temperature and/or pressure control systems, to facilitate more efficient operation of a WAO unit for the treatment of spent caustic. For example, the pH of one or both of the caustic mixture to be treated or the effluent of the WAO system may be monitored by a pH sensor or sensors, and a pH adjustment system activated to adjust the pH of the caustic mixture to be treated in response to a detected pH level. The pH adjustment system may include one or more pH monitors or sensors, a controller coupled to or in electrical communication with the one or more pH sensors, and one or more sources of pH adjuster. The pH adjuster may comprise acids such as sulfuric acid, carbon dioxide, and/or bases such as NaOH. The pH adjuster may be added at various locations in the WAO system, such as at an inlet to the WAO vessel, at an outlet of the WAO vessel, in the WAO unit itself, or in any of the various pipes associated with the system, and in fluid communication with the WAO unit.

An embodiment of a system for treating a combined stream of refinery spent caustic and ethylene spent caustic is illustrated schematically in FIG. 1. The refinery spent caustic enters the system through line 102 and enters holding/buffer tank 104. The ethylene spent caustic enters the system through line 106 and enters holding/buffer tank 108. Holding tanks 106 and 108 may be omitted in some aspects of the embodiment illustrated in FIG. 1. Either periodically or continuously, refinery spent caustic and ethylene spent caustic may be pumped by pumps (not shown) into mixing tank 110 to form a mixed caustic solution. Mixing tank 110 may also serve as a buffer tank for the mixed caustic solution. The mixed caustic solution then proceeds from mixing tank 110 through high pressure pump 112, through heat exchanger 114, and into WAO reaction vessel 116. In heat exchanger 114, the mixed caustic solution may be pre-heated by absorbing heat from oxidized mixed caustic exiting the WAO reaction vessel 116. Either before or after passing through high pressure pump 112, a pH adjuster, such as an acidic compound (such as sulfuric acid and/or carbon dioxide) or a base (such as NaOH) may be introduced into the mixed caustic from source of pH adjuster 118. Alternately, or in addition to source of pH adjuster 118, a source of catalyst (not shown) may also be provided.

The mixed caustic is treated in the WAO reaction vessel 116 at an elevated temperature and pressure to form an oxidized mixed caustic. An oxygen containing gas such as air may be introduced into WAO reaction vessel 116 from source of oxygen containing gas 120.

A pH adjuster, such as carbon dioxide from pH adjuster source 122 may be introduced into the WAO reaction vessel 116 along with the oxygen containing gas from source 120. A pH adjuster, such as carbon dioxide, in solid, liquid, or gaseous form, may also be introduced into the headspace of WAO reaction vessel 116 from pH adjuster source 124. The introduction of carbon dioxide into the head space of the WAO vessel may allow for a finer degree of pH control of the mixed caustic solution than direct addition of acid.

Oxidized mixed caustic may exit WAO reaction vessel 116 through line 126 and pass through heat exchanger 114, where it transfers heat to mixed caustic to be treated in WAO reaction vessel 116. The oxidized mixed caustic may then proceed to liquid/vapor separation unit 128. At one or more points along the line or lines carrying the oxidized mixed caustic may be a pH monitor 130 which may detect the pH of the oxidized mixture, and in response to the detected pH, a controller (not shown) may generate a signal to control the addition of pH adjuster from any or all of pH adjuster sources 118, 122, and 124.

In liquid/vapor separation unit 128, vapors, such as carbon dioxide, are separated from the liquid oxidized caustic mixture and released through vapor line 132 to be recycled, and/or further treated, and/or released to the environment. Liquid exiting liquid/vapor separation unit 128 may precede to a further treatment system, such as biological treatment unit 134, and then be recycled, and/or further treated, and/or released to the environment. Liquid exiting liquid/vapor separation unit 128 may also be pH adjusted by source of pH adjuster 136 in response to a pH reading from pH monitor 130, or from another pH monitor (not shown).

In alternate aspects of the disclosed system, multiple WAO vessels 116 may be utilized in series or in parallel, and any of a number of post-treatment systems, such as membrane filtration, biological treatment, hydrocyclone separation, etc. may be used.

Figure 2:
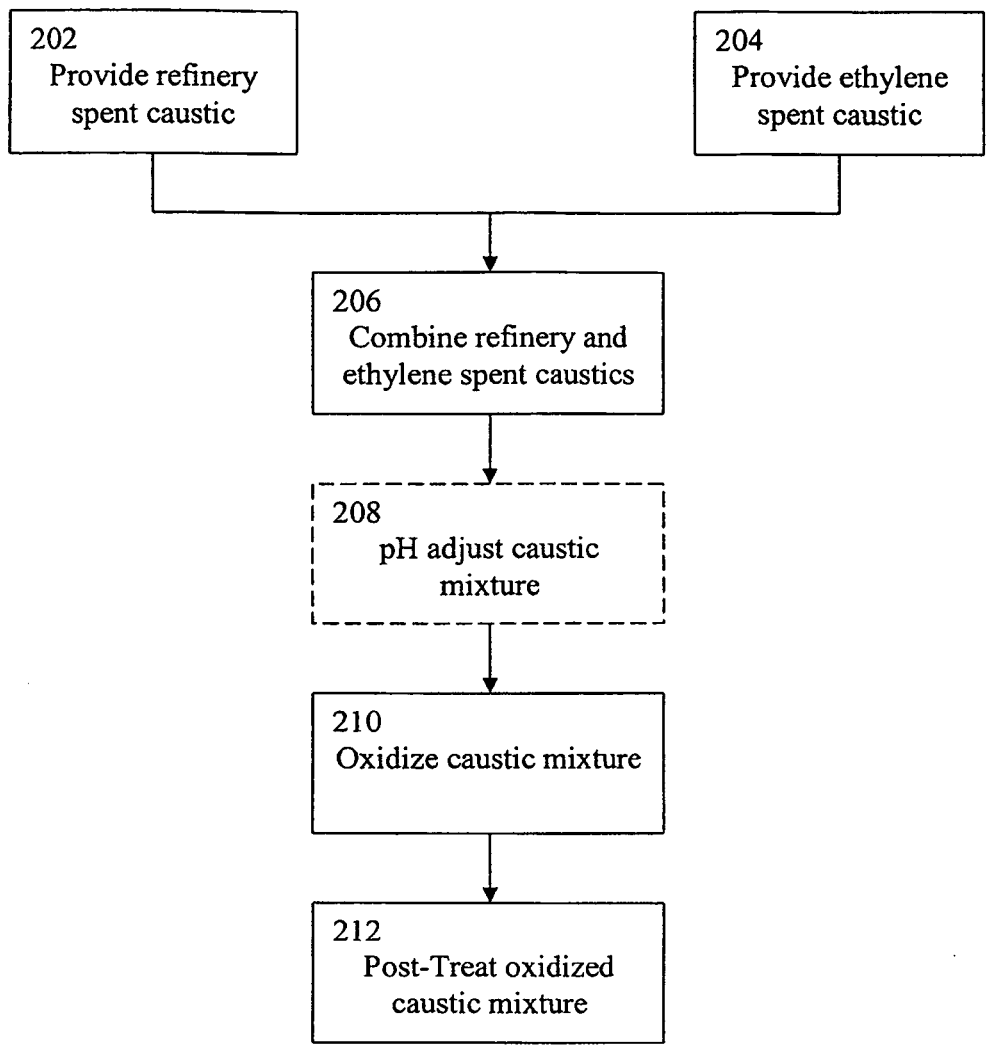
FIG. 2 is a flow chart of a method of treating spent caustic waste according to an embodiment of the present disclosure.

FIG. 2 is a flow chart illustrating a method according to an embodiment of the present disclosure for treating spent caustic. In step 202 refinery spent caustic is provided. In some aspects, the refinery spent caustic may be produced intermittently or periodically, and may be provided to a holding or a buffer tank prior to treatment. The refinery spent caustic may in some aspects be a combination of one or more of naphthenic spent caustic, cresylic spent caustic, and sulfidic spent caustic. In step 204, an ethylene spent caustic is provided. The ethylene spent caustic may be provided to a holding or a buffer tank prior to treatment. In some aspects, the refinery spent caustic and the ethylene spent caustic may be provided from the same facility. In other aspects, the refinery spent caustic and the ethylene spent caustic may be generated simultaneously at one facility or at different facilities and/or at different times.

In step 206, the refinery spent caustic and the ethylene spent caustic are combined. In some aspects, additional waste fluids, such as amine wastewater, sour wastewater, wash water, decant slop, and biological sludge may also be combined with the spent caustics at this step. This combination may take place in a mixing vessel, or in some aspects may be performed by injecting the spent caustics and/or other waste fluids directly into a line leading to a treatment system. The refinery spent caustic, ethylene spent caustic, and in some aspects, other waste fluids, may be combined in a ratio to produce a mixture with a COD of less than that which may result in the precipitation of carbonates and/or less than that which would make temperature control of the WAO unit difficult during WAO treatment, such as less than about 125,000 mg/L. In some aspects, a target COD of the mixture may be set at between about 20,000 mg/L and about 100,000 mg/L.

In optional step 208, the pH of the mixture may be adjusted. The pH may be adjusted so that the mixture does not damage the WAO vessel by being too caustic or by becoming too acidic as a result of oxidation reactions. In some aspects, especially those where a treatment vessel constructed of a material such as nickel which is resistant to attack by caustic solutions is utilized, the pH of the mixture may be adjusted upward by the addition of a base such as sodium hydroxide. This may help prevent the oxidized mixed caustic from becoming acidic and attacking the WAO vessel. The dilution of the refinery spent caustic with ethylene spent caustic may provide a similar benefit in that the presence of the ethylene spent caustic may buffer the pH of the mixed caustic solution.

In other aspects, the pH of the mixture may be adjusted downward by the addition of an acid such as sulfuric acid, or by the addition of carbon dioxide. In some aspects the pH of the mixture may be adjusted to below about 12. In these aspects, a WAO treatment vessel constructed of stainless steel or titanium might be utilized. In some aspects, reducing the pH of the mixed caustic may increase the efficiency of the WAO treatment (see Example 2 below).

In step 210, the mixture is transferred to a treatment vessel where wet air oxidation of the mixture may take place. The mixture may be pre-heated by passing through a heat exchanger before entering the treatment vessel. In some aspects, wet air oxidation of the mixture may be performed at a temperature and pressure sufficient to break down components such as naphthenic acids in the caustic mixture. The temperature at which the wet air oxidation unit may be operated may be in a range as high as from about 200° C. to about 320° C. In other aspects, the temperature at which the wet air oxidation unit may be operated may be in a range as of from about 200° C. to about 280° C. In one embodiment, the temperature of the wet air oxidation unit may range from about 240° C. to about 320° C., or in a range of from about 240° C. to about 260° C. Components such as phenols and mercaptans may also be oxidized under these conditions. Higher or lower temperatures may be utilized depending on the composition of the caustic mixture to be treated and/or the degree of COD destruction desired.

Sufficient oxygen-containing gas is typically supplied to the system to maintain residual oxygen in the wet oxidation system off gas, and the superatmospheric gas pressure is typically sufficient to maintain water in the liquid phase at the selected oxidation temperature. For example, the minimum system pressure at about 240° C. is about 33 atmospheres, and in some embodiments may be about 80 atmospheres. At 220° C. a pressure of between about 40 and about 60 atmospheres may be used. The minimum pressure at about 280° C. is about 64 atmospheres, and the minimum pressure at about 373° C. is about 215 atmospheres. In one embodiment, the aqueous mixture is oxidized at a pressure of about 30 atmospheres to about 275 atmospheres. The wet oxidation process may be operated at an elevated temperature below about 374° C., the critical temperature of water. In some embodiments, the wet oxidation process may be operated at a supercritical elevated temperature. The retention time for the aqueous mixture within the reaction chamber should be generally sufficient to achieve the desired degree of oxidation. In some embodiments, the retention time may be least about 15 minutes and up to about six hours. In some embodiments, the retention time may range from about 60 min. to about 90 min. In other embodiments, the retention time may be about one hour.

An oxygen containing gas, such as air, oxygen enriched air (air containing greater than 21% oxygen), or pure oxygen may be provided to the wet air oxidation unit during the treatment of the caustic mixture, although any oxidizing agent may be used (for example, ozone, peroxide, permanganate, or combinations thereof). A pH adjuster, such as carbon dioxide, may also be provided to the wet air oxidation unit during the treatment of the caustic mixture. The pH adjuster may be provided along with the oxygen containing gas, or may be provided into the wet air oxidation unit at a different location, such as the head space of the WAO vessel. The caustic mixture may in some aspects have a hydraulic retention time of between about 60 and about 90 minutes in the WAO vessel, although shorter or longer hydraulic retention times may be utilized depending on the composition of the caustic mixture to be treated and/or the degree of COD destruction desired.

After oxidation in the WAO vessel, the oxidized spent caustic mixture may leave the vessel, by pumping or otherwise, and be post-treated (step 212). Post-treatment may involve pH adjustment, such as pH adjustment of the oxidized mixture toward a neutral pH. Post-treatment may also involve liquid/gas separation and further treatment of the separated gas, liquid, or both. The liquid may be further treated in a biological treatment unit to break down or neutralize remaining impurities and/or may be treated in a filtration system, such as a membrane filtration system. The gas and/or the post treated liquid may then be recycled or released to the environment. For example, if carbon dioxide is recovered from the oxidized mixture, it may be re-used as a pH adjustment agent in the treatment system.

Figure 3:
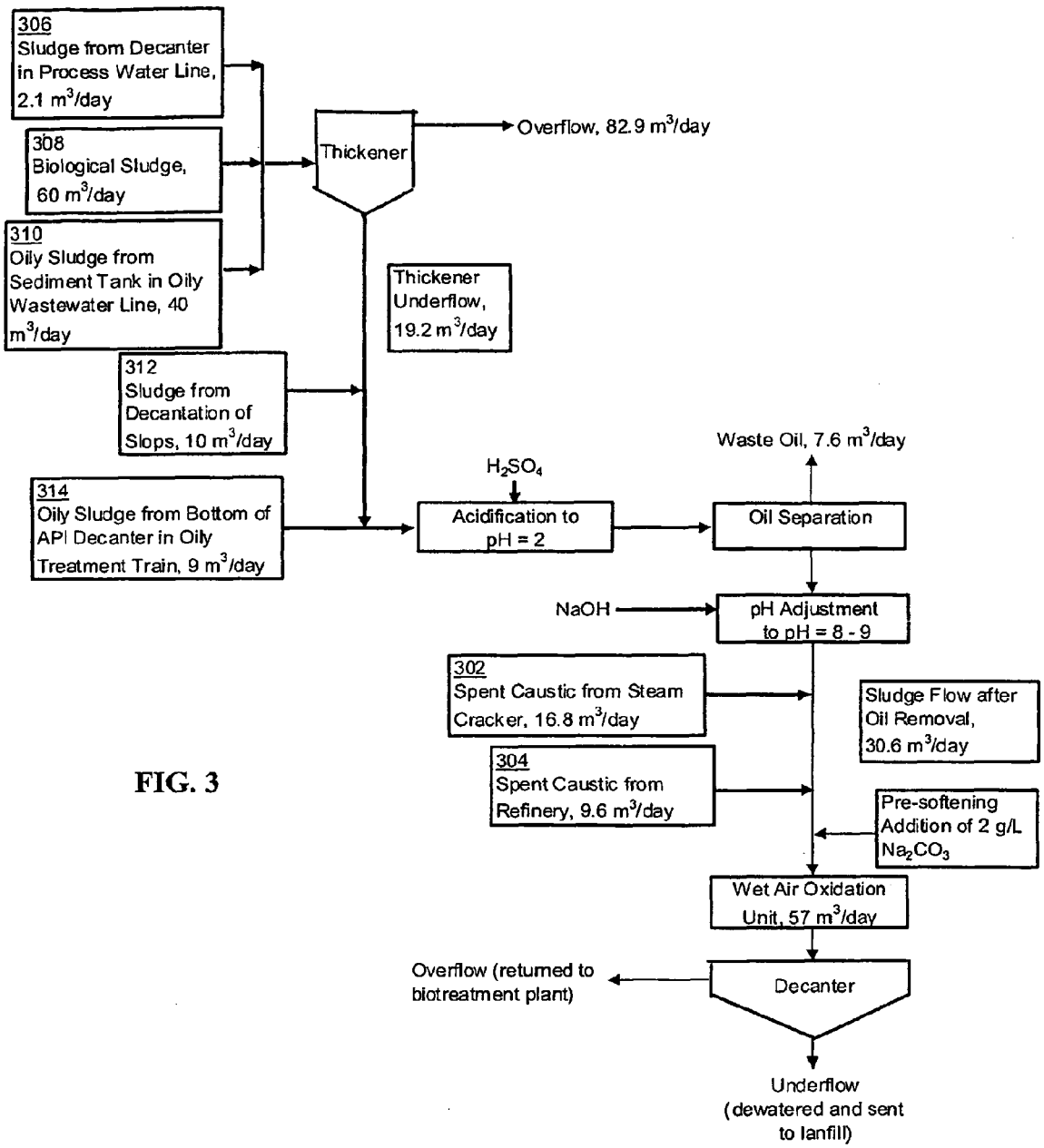
FIG. 3 is a schematic diagram illustrating various possible sources of waste that may be treated in a wet air oxidation unit in accordance with an embodiment of the present disclosure.

FIG. 3 is a schematic diagram illustrating various potential sources and potential flow rates of sludges and spent caustics and various pre-treatment steps that may be applied prior to WAO of a mixture of these sludges and spent caustics. From this figure it can be seen that additional waste may be treated in a WAO unit in addition to ethylene spent caustic and refinery spent caustic, 302 and 304 respectively, includes sludge from a process water decanter 306, biological sludge 308, oily sludge from a sediment tank in an oily wastewater line 310, sludge from the decantation of slops 312, and oily sludge from the bottom of an API decanter (a separator designed to American Petroleum Institute standards) in an oily treatment train 314.

FIG. 3 also illustrates other processes that may be performed on the various waste streams prior to WAO treatment. For example, oily sludge may be passed through a thickener to recover some water that may be subject to further post treatment. Waste oils may be removed from the sludge streams by a process of pH adjustment and oil separation by means of a hydrocyclone or other wise. Also, a pre-softener, such as $Na_2CO_3$ may be added to the waste stream prior to WAO.

EXAMPLES

Example 1

Comparison of the WAO Treatment of Refinery Spent Caustic Diluted with Water Versus Refinery Spent Caustic Diluted with Ethylene Spent Caustic A mixture of approximately 74% ethylene spent caustic and 16% refinery spent caustic was treated in a WAO unit as shown in FIG. 1 at 240° C. with a hydraulic retention time of 90 minutes. The COD destruction level and the pH of the effluent of the reaction vessel were measured. These quantities were compared to those achieved by treating a naphthenic spent caustic under the same conditions. As can be seen in Table 4 below, the COD destruction of the mixed caustics was approximately 84% while the COD destruction of the naphthenic spent caustic diluted with water was approximately 79%. Also, the data shows that the ethylene spent caustic buffered the pH of the refinery spent caustic during the oxidation process; the oxidized refinery spent caustic diluted with water displayed a pH of 8.2 while the oxidized refinery spent caustic diluted with ethylene spent caustic displayed a pH of 8.4. This data shows that a mixture of ethylene spent caustic and refinery spent caustic may successfully be treated in a WAO unit under conditions that may be used to treat a naphthenic spent caustic diluted with water. This may lead to an increased efficiency of operation in that a single process may be utilized to treat the two different streams of spent caustic, allowing for the elimination of separate systems for the treatment of the different spent caustics.

TABLE 4

|  | Units | Reported As | Refinery Spent Caustic Diluted With Water | Refinery Spent Caustic Diluted With Ethylene Spent Caustic |
|---|---|---|---|---|
| Charge Conditions |  |  |  |  |
| Reaction Temperature | ° C. | — | 240 | 240 |
| Residence Time | minutes | — | 90 | 90 |

TABLE 4-continued

| | Units | Reported As | Refinery Spent Caustic Diluted With Water | Refinery Spent Caustic Diluted With Ethylene Spent Caustic |
|---|---|---|---|---|
| Spent Caustic Composition | | | | |
| Naphthenic Spent Caustic | % | — | 100 | 14.8 |
| Cresylic Spent Caustic | % | — | — | 2.2 |
| Sulfidic Spent Caustic | % | — | — | 9.1 |
| Ethylene Spent Caustic | % | — | — | 73.8 |
| Analytical Results | | | | |
| COD Feed | mg/L | $O_2$ | 75,545 | 38,100 |
| COD Effluent | | $O_2$ | 17,020 | 6,125 |
| COD Reduction | % | — | 78.5 | 83.8 |
| pH | — | — | 8.2 | 8.4 |

Example 2

Reduction in Caustic pH vs. COD Removal

Samples of a spent caustic were obtained from a diesel wash process from a refinery and treated in a wet air oxidation unit as shown in FIG. 1. The samples were diluted with water in order to reduce the COD of the samples and divided into two groups. Control tests of diluted spent caustic samples all having a pH of greater than 12 were oxidized in a WAO at a temperature of 260° C. and a pressure of about 80 atm for about 1 hour. The COD destruction for each ranged from about 60% to about 70%.

The pH of the other group of samples was reduced to about 10.5 by the addition of sulfuric acid. These samples were oxidized in a WAO at a temperature of 240° C. and pressures ranging from about 60 atm for about 1 hour. The COD destruction for each pH adjusted sample was about 80%. The addition of the acid to reduce the pH of the spent caustic generally improved efficiency by as much as about 10%, even when oxidized at a lower temperature and pressure. This reduction in pH increased COD destruction efficiency and may also result in lower operating and capital costs associated with the ability to use less expensive materials of construction.

Example 3 pH Reduction of Caustic with Sulfuric Acid vs. with Carbon Dioxide

Two samples of refinery spent caustic were treated in a WAO system, each at 240° C. with a hydraulic residence time of 90 minutes. Prior to treatment, one of the samples was pH adjusted by the addition of sulfuric acid, while the other was pH adjusted by the addition of carbon dioxide. The data presented below in Table 5 was obtained from continuous flow pilot data. It can be seen from this data that performing WAO after pH reduction with carbon dioxide resulted in a higher COD reduction (approximately 80%) relative to the same process performed with a pH reduction performed by the addition of sulfuric acid to the spent caustic (a COD reduction of approximately 72%). Without being bound by any particular theory, it is believed that some of the organics in the spent caustic are converted into acid oils when the pH is lowered using a strong acid such as sulfuric acid. When carbon dioxide is used, these organics remain as alkaline salts for a longer period of time during the oxidation process.

TABLE 5

| | Units | pH control with H2SO4 | pH control with CO2 |
|---|---|---|---|
| Test Number | | 29 | 32 |
| Charge Conditions | | | |
| Reaction Temperature | ° C. | 240 | 240 |
| Residence Time | minutes | 90 | 90 |
| Spent Caustic Composition | | | |
| Naphthenic Spent Caustic | % | 63.0 | 63.0 |
| Cresylic Spent Caustic | % | 9.0 | 9.0 |
| Sulfidic Spent Caustic | % | 28.0 | 28.0 |
| Ethylene Spent Caustic | % | — | — |
| Analytical Results | | | |
| COD Reduction | % | 72.4 | 80.4 |
| Organic COD Reduction | % | 69.4 | 78.6 |
| pH | — | 8.1 | 8.2 |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for treating a waste stream comprising:
providing an ethylene production spent caustic comprising at least a first organic compound;
providing a refinery spent caustic comprising at least a second organic compound;
combining at least a portion of the ethylene production spent caustic with at least a portion of the refinery spent caustic in a mixing vessel in a ratio sufficient to produce a combined stream comprising a COD level below that which results in the precipitation of carbonate during wet air oxidation of the combined stream; and
oxidizing by wet air oxidation the combined stream at an elevated temperature and a super-atmospheric pressure sufficient to treat at least a portion of the second organic compound.

2. The method of claim 1, further comprising:
monitoring a pH of the oxidized combined stream with a pH sensor; and
adding a pH adjuster to the combined stream responsive to a signal from the pH sensor.

3. The method of claim 2, wherein the pH adjuster is carbon dioxide.

4. The method of claim 2, wherein the pH adjuster is a base.

5. The method of claim 1, further comprising biologically treating at least a portion of the oxidized combined stream.

6. The method of claim 5, further comprising adjusting the pH of the portion of the oxidized combined stream prior to the biological treatment.

7. The method of claim 1, wherein the step of combining at least a portion of the ethylene production spent caustic with at least a portion of the refinery spent caustic comprises combining at least a portion of the ethylene production spent caustic with at least a portion of the refinery spent caustic in a piping system used to treat the combined stream.

8. The method of claim 1, further comprising adding at least one of amine wastewater, sour wastewater, wash water, decant slop, and biological sludge to the combined stream.

9. The method of claim 1, wherein oxidizing the combined stream comprises oxidizing the combined stream at a temperature in a range of between about 200° C. and about 280° C.

10. The method of claim 1, wherein the second organic compound is a naphthenic compound.

11. The method of claim 1, wherein the second organic compound is a cresylic compound.

12. The method of claim 1, wherein the COD level of the combined stream is less than about 125,000 mg/L.

13. A method for treating a waste stream comprising:
providing a sulfidic spent caustic comprising at least one oxidizable compound;
providing a refinery spent caustic comprising at least one organic compound;
combining at least a portion of the sulfidic spent caustic with at least a portion of the refinery spent caustic in a ratio sufficient to produce a combined stream comprising a COD level below that which results in the precipitation of carbonate during wet air oxidation of the combined stream; and
wet air oxidizing the combined stream at an elevated temperature and a super-atmospheric pressure sufficient to treat at least a portion of the organic compound.

14. The method of claim 13, further comprising:
monitoring a pH of the oxidized combined stream with a pH sensor; and
adding a pH adjuster to the combined stream responsive to a signal from the pH sensor.

15. The method of claim 14, wherein the pH adjuster is carbon dioxide.

16. The method of claim 15, wherein oxidizing the combined stream comprises oxidizing the combined stream in a wet air oxidation unit and introducing the carbon dioxide into the combined stream upstream of the wet air oxidation unit.

17. The method of claim 14, wherein the pH adjuster is a base.

18. The method of claim 13, further comprising biologically treating at least a portion of the oxidized combined stream.

19. The method of claim 18, further comprising adjusting the pH of the portion of the oxidized combined stream prior to the biological treatment.

* * * * *